Patented Sept. 15, 1925.

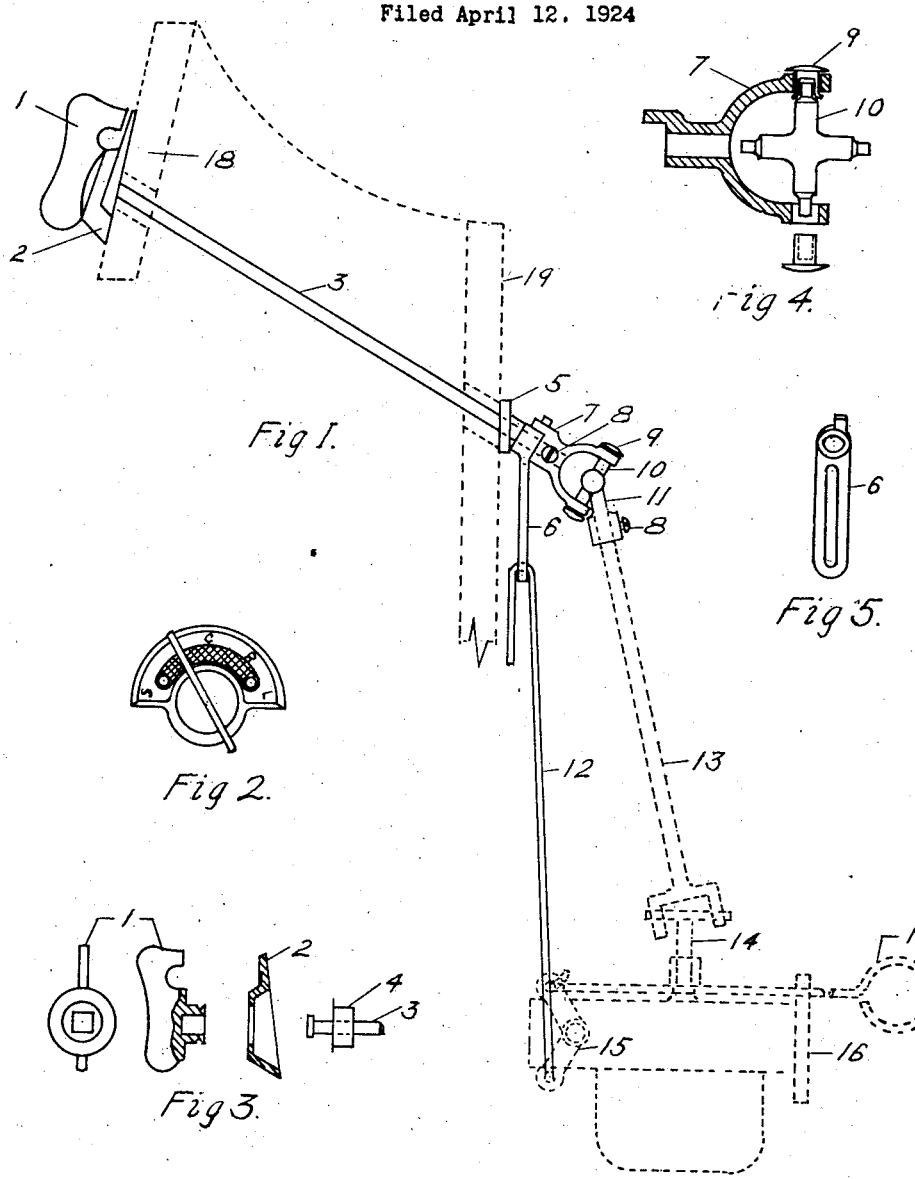

1,553,708

UNITED STATES PATENT OFFICE.

CLARK H. MORRELL, OF FITCHBURG, MASSACHUSETTS.

CARBURETOR CONTROL.

Application filed April 12, 1924. Serial No. 706,181.

*To all whom it may concern:*

Be it known that I, CLARK H. MORRELL, a citizen of the United States, residing at Fitchburg, in the county of Worcester and the State of Massachusetts, have invented certain new and useful Improvements in Carburetor Controls, of which the following is a specification.

This invention relates to new and useful improvements in carburetor controls for a conventional form of automobile and particularly to means whereby the fuel can be mixed in better proportions to meet the requirements of a gasoline engine for quick starting and flexible control.

One object of the invention resides in the provision of such means that the engine can be started quicker to thus save the battery of a long turning effort.

Another object of the invention resides in the provision of such means whereby the engine can be supplied with gasoline fuel in such proportions that it eliminates the necessity of racing it, even in cold weather, to keep it running after having been once started.

Another object of the invention resides in the provision of a device whereby the operator can gauge a fuel mixture of suitable proportions to enter the engine, while it is being warmed up, without using the choke, a feature particularly convenient for those learning to drive and who have not acquired the art of controlling the engine by sound.

Another object of the invention resides in the provision of such means whereby the needle valve of the carburetor is caused to rotate at less speed than the pointer as an economical adjustment is approached.

A still further object of the invention resides in the provision of such means in a device that can be associated with a conventional form of automobile whereby the operator can conveniently set a pointer on a gauge to correspond to either, a flexible running mixture most desirable when traveling in traffic, or a lean mixture for power efficiency and economical gasoline consumption when on the highway.

With these and other objects in view, the invention resides in the novel combination, formation and arrangement of parts to be more fully hereinafter described and illustrated in the accompanying drawings and particularly pointed out in the claims hereto attached.

Reference is had to the accompanying drawings wherein similar characters of reference designate corresponding parts throughout the several views, and in which:

Figure 1 is a side elevational view of the device applied to a conventional form of automobile. The parts included in the invention are drawn in full black lines and numbered 1 to 12 inclusive. Those drawn dotted are parts not included in the invention and are numbered 13 to 17 inclusive. The instrument board is represented by 18 and the dash board by 19.

Figure 2 is a view of the gauge and dial assembly.

Figure 3 indicates the order of assembly of the gauge, pointer, turning shaft and locking cup.

Figure 4 indicates the method of assembling the universal joint.

Figure 5 illustrates the design of the choker arm.

Referring more particularly to the accompanying drawings, 1 is a pointer with a grooved hub having a square bore.

A gauge 2, semi-circular in form, with a semi-circular sunken impression for design, in which are two holes for screw attachment to the instrument board. Around the outer rim are letters S—C—R—L indicating respectively start—cold—run—lean. Around the center is a slight hub in which is a hole corresponding in size to the hub of the pointer 1. The underside of the gauge is hollowed out to allow for flush assembly.

The turning shaft 3 has a square piece of metal welded on one end to compare in size with the square bore in hub of pointer 1.

The pressed metal locking cup 4 has a hole thru its center, slightly larger than the shaft 3 and smaller than the diagonal dimension of the square on the shaft. The larger diameter of the cup 4 corresponds in size with the hub of pointer 1. As illustrated in Figure 3, the hub of pointer 1 extends thru the gauge 2, receiving the square end of shaft 3 in its square bore with the locking cup 4 on its outer diameter. A portion of the locking cup 4 is pressed into the groove of hub of pointer 1, thereby locking together parts 1—2—3 and 4 as a unit, allowing the pointer 1, shaft 3 and locking cup 4 to turn independent of gauge 2.

A bearing 5 supports the lower end of shaft 3 and is suitably attached to the dash by screws.

The choker arm 6 fits freely on shaft 3 and adjacent to bearing 5. It has a lug on the top by which it is turned. A long slot allows the use of choker wire 17.

One yoke of the universal joint 7—8—9—10—11 is firmly attached to the shaft 3 by screws 8 and so positioned that its arms are in the same plane as pointer 1, and its body adjacent to choker arm 6. A lug, integral with yoke 7 engages in contact with a similar lug on choker arm 6.

The ends of star piece 10 are turned, leaving a concave shoulder for the purpose of spreading the tube end of rivets 9 as they are forced on in assemblying the joint.

A choker wire 12 is connected at one end to the lever 15, and at the end to choker arm 6. The end of the wire 12 is passed thru the slot in arm 6, leaving a long end to prevent it from coming detached when choke valve is operated by wire 17.

The forked rod 18 is cut off to the desired length determined by the position of the device when installed.

Gasoline adjustment of carburetor 16 is made by turning the needle valve 14.

I claim:—

1. In a carburetor control, in combination with a carburetor of a gasoline engine in an automobile having an instrument board and dash, said carburetor having two control valves one known as an air choke valve and the other a fuel valve, each controlled independently of the other from the top side of said carburetor, a gauge with distinguishing letters stamped near the edge of the arc, said gauge attached stationarily to the instrument board axially receiving a pointer with a square bore within its hub, a control rod with one end squared to engage the square bore of said pointer, permitting said pointer and said control rod to be rotatable as a unit with their axes out of alignment, the other end of said control rod, supported by a bearing attached to the dash, extending thru and carrying, keyed to it, one part of a universal joint having a lug engaging with a lug on a choke arm adjacent to said universal joint, said arm floating on said control rod and engaging at its other end a wire attached to said air choke valve, the other end of said universal joint being keyed to a rod engaging said fuel valve.

2. In a carburetor control, in combination with a carburetor of a gasoline engine in an automobile having an instrument board and dash, said carburetor having two control valves, one known as an air choke valve and the other a fuel valve, each controlled independently of the other from the top side of said carburetor, a gauge with distinguishing letters stamped near the edge of the arc, said gauge attached stationarily to the instrument board and axially receiving a pointer with a square bore within its hub, a control rod, with one end squared to engage the square bore of said pointer, said gauge, said pointer and said control rod held in assembly by a cap being crimped over the hub of said pointer, permitting said pointer and said control rod to be rotatable as a unit with their axes out of alignment, the other end of said control rod, supported by a bearing attached to the dash, extending thru and carrying, keyed to it, one part of a universal joint having a lug engaging with a lug on a choke arm, adjacent to said universal joint, said arm, floating on said control rod and engaging at its other end a wire attached to said air choke valve, the other end of said universal joint being keyed to a rod engaging said fuel valve, the parts being so related that when the pointer is in a central position the lug on the universal joint engages the lug on said choke arm, and movement of the pointer in a contra clockwise direction will simultaneously close said choke valve and increase the opening of the fuel valve.

3. In a carburetor control, in combination with a carburetor of a gasoline engine in an automobile having an instrument board and dash, said carburetor having two control valves, one known as an air choke valve and the other a fuel valve each controlled independently of the other from the top side of said carburetor, a gauge with distinguishing letters stamped near the edge of the arc, said gauge attached stationarily to the instrument board and axially receiving a pointer with a square bore within its hub, a control rod with one end squared to engage the square bore of said pointer, said gauge, said pointer and said control rod to be rotatable as a unit with their axes out of alignment, the other end of said control rod, supported by a bearing attached to the dash, extending thru and carrying, keyed to it, one part of a universal joint having a lug engaging with a lug on a choke arm, adjacent to said universal joint, said arm, floating on said control rod and engaging at its other end a wire attached to said air choke valve, the other end of said universal joint being keyed to a rod engaging said fuel valve, the parts being so related that when the pointer is in a central position the lug on the universal joint engages the lug on said choke arm, and movement of the pointer in a contra clock-wise direction will simultaneously close said choke valve and increase the opening of the fuel valve, while a movement of the pointer in a clock-wise direction will decrease the opening of the fuel valve without changing the position of said choke valve.

CLARK H. MORRELL